May 1, 1951     D. G. AUSTIN     2,551,310

EGG CLEANING MACHINE

Filed Sept. 17, 1948     3 Sheets-Sheet 1

Douglas G. Austin
INVENTOR.

BY *Clarence A. O'Brien*
*and Harvey B. Jackson*
Attorneys

Douglas G. Austin
INVENTOR.

May 1, 1951 D. G. AUSTIN 2,551,310
EGG CLEANING MACHINE
Filed Sept. 17, 1948 3 Sheets-Sheet 3
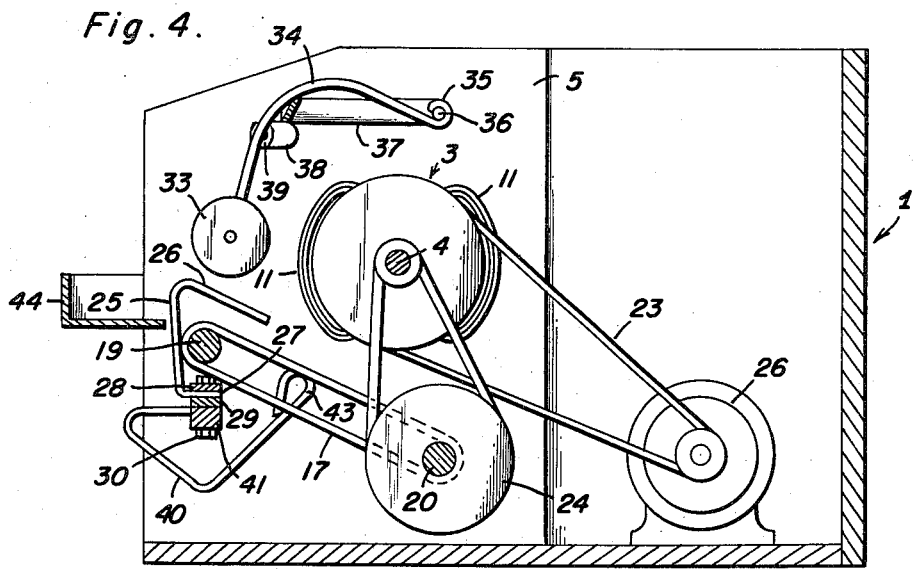
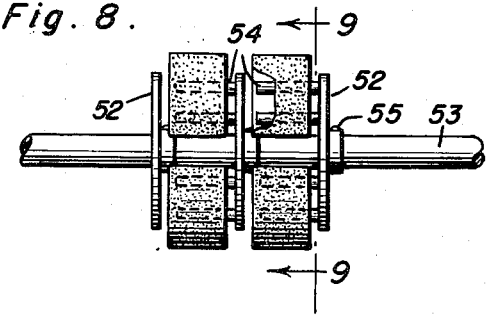
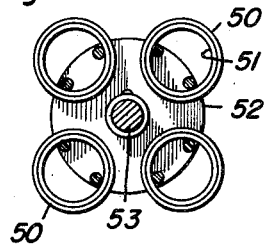
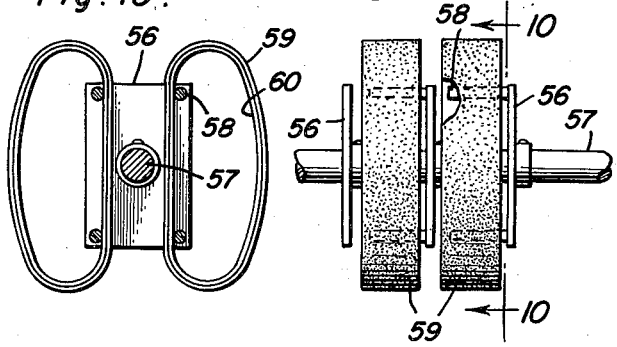
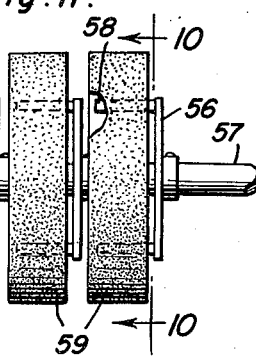
Douglas G. Austin
INVENTOR.

Patented May 1, 1951

2,551,310

UNITED STATES PATENT OFFICE 2,551,310

EGG CLEANING MACHINE

Douglas G. Austin, Wellsboro, Pa.

Application September 17, 1948, Serial No. 49,775

5 Claims. (Cl. 51—103)

My invention relates to improvements in egg cleaning machines of the egg tumbling, rotary cleaner type.

The primary object of this invention is to provide a machine of the type indicated especially constructed and arranged to uniformly clean, without scarring, different sizes of eggs with rough, hard shells, as well as those with smoother soft shells, for instance, the usual brown and white shell eggs.

Another object is to provide in such machines improved means for causing the eggs to wobble, or tumble, before rotary, flexible, abrasive cleaners and so that all parts of the eggs are contacted by the cleaners and uniformly cleaned without danger of breaking the eggs or injuriously shaking the same.

Another object is to provide a machine of the character and for the purpose above set forth which is simple in construction, adapted for comparatively high speed operation without injury to the eggs, and is inexpensive to install and operate.

Other and subordinate objects within the purview of my invention, together with the precise nature of my improvements, will be readily understood when the succeeding description and claims are read with reference to the drawings accompanying and forming part of this specification.

In said drawings:

Figure 4 is a view in vertical longitudinal section taken on the line 4—4 of Figure 1;

Figure 8 is a fragmentary view in front elevation, partly broken away, of a modified embodiment of my invention;

Figure 9 is a view in vertical transverse section taken on the line 9—9 of Figure 8;

Figure 10 is a view in transverse section of another modified embodiment of my invention taken on the line 10—10 of Figure 11; and Figure 11 is a view in front elevation of the same.

Figure 1:
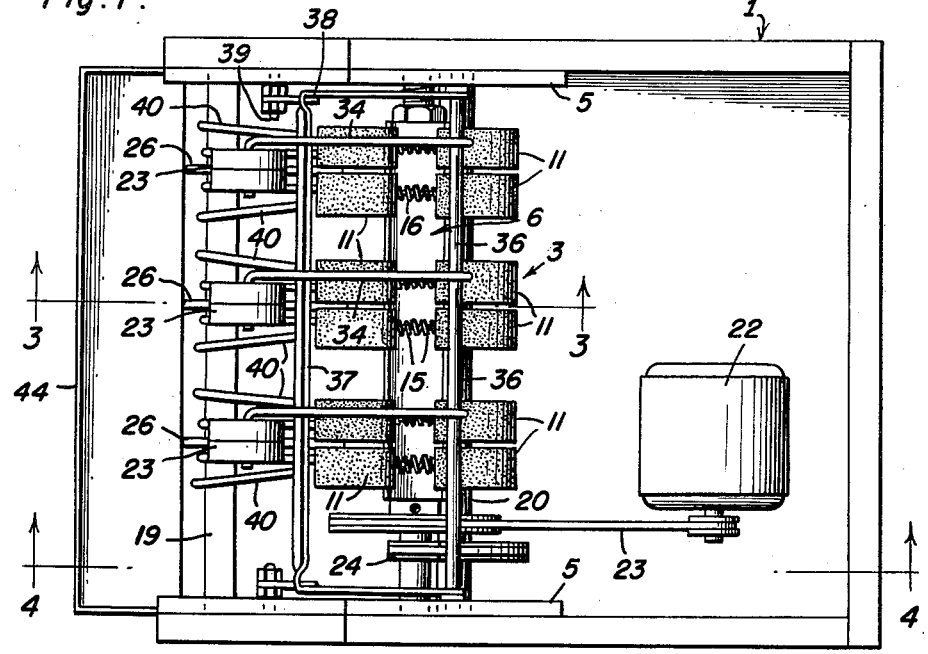
Figure 1 is a view in plan of my improved egg cleaning machine in the preferred embodiment thereof.
Figure 2:
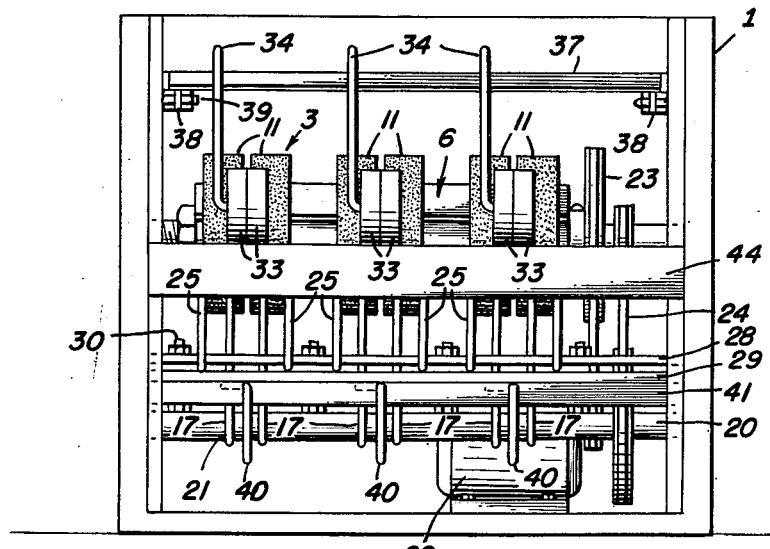
Figure 2 is a view in front end elevation.
Figure 3:
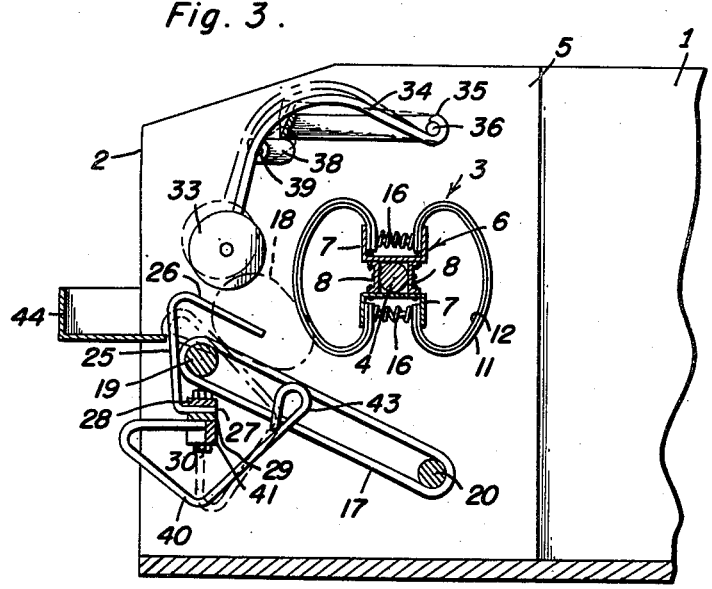
Figure 3 is a fragmentary view in vertical longitudinal section taken on the line 3—3 of Figure 1.
Figure 6:
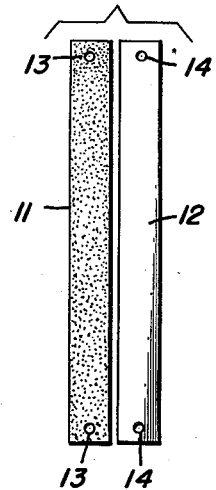
Figure 6 is a composite view of one of the cleaner strips and the backing strip therefor.
Figure 5:
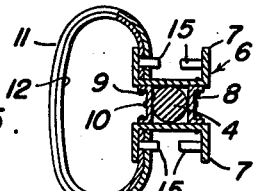
Figure 5 is a fragmentary view in transverse section of the egg cleaning reel.
Figure 7:
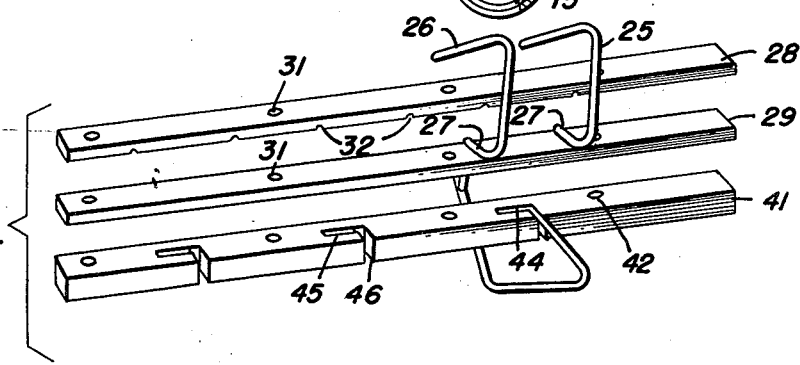
Figure 7 is an exploded view in perspective of the clamping bars for the egg guiding rods, together with the mounting bar for the egg ejecting rods.

Referring to the drawings by numerals, and first to Figures 1 to 7, my improved egg cleaning machine in the preferred embodiment thereof comprises a rectangular, box-like, open-top casing with an open front end 2, and which contains the moving parts of the machine.

According to my improvements, a rotary egg cleaning reel 3 is provided in the casing 1 to extend horizontally across the same parallel with and adjacent to said front end 2, and which comprises a reel shaft 4 suitably journaled in a pair of side cheek plates 5 secured in the casing 1 in any suitable manner.

Surrounding and fitting the reel shaft 4 is a reel core 6 comprising a pair of diametrically opposite channel bars 7 with channel sides outermost, and another pair of similar, diametrically opposite, spacing bars 8 riveted, as at 9, to the channel bars 7 and fixed to the reel shaft 4, as at 10, to detachably secure the reel core 6 to said shaft.

The reel core 6 carries sets of flexible, abrasive cleaner strips 11 extending endwise across the axis of said reel 6, the sets being equidistantly spaced apart along the reel core 6 and each set comprising pairs of diametrically opposite strips 11 with the pairs arranged side by side with a slight clearance between the same to obviate interference of the strips of the pairs in flexing thereof. Each cleaner strip 11 is provided with a rubber, or other resilient material backing strip 12 of the same width and length, preferably separate therefrom. The cleaner strips 11 and backing strips 12 are detachably secured at the ends thereof in the channel bars 7 so that said strips normally bulge outwardly of the reel core 6, into oval form, and, under centrifugal action, when the reel 6 is rotated, are deformed to bulge further from said core. The backing strips 12, as will be clear, yieldingly oppose flattening of the cleaner strips 11 out of normal bulging position.

The securing means for said strips 11, 12 comprises end apertures 13, 14 in said strips fitting over pairs of opposite pins 15 in the channel bars 6, spaced apart in alignment in the pairs, and helical expansion springs 16 on the pairs of pins 15 holding the ends of said strips 11, 12 against the sides of the channel bars 7, but, being removable, when compressed, through the space between the pairs of pins 15 to permit detachment of said strips 11, 12 from said pins 15 for renewal and replacement purposes. In this connection, the cleaner strips 11 are abrasive on both sides thereof for reversal on the reel core 6 which is of distinct advantage in providing for economical operation of the machine.

Pairs of coplanar supporting and feeding belts 17 for the eggs, preferably round in cross section and resilient, slant downwardly and rearwardly beneath the sets of cleaner strips 11, one pair for each set, the belts 17 of the pairs being disposed in vertical planes and spaced apart laterally, equi-distantly, upon opposite sides of the median planes of the set and extending forwardly of the egg cleaning reel 3 sufficiently to support eggs, as shown in broken lines at 18, on the upper runs of the pairs of said belts in advance of said reel. Front and rear rollers 19, 20 extending across the casing 1 with ends suitably journaled in the cheek plates 5 support the pairs of egg supporting and feeding belts 17 and are suitably grooved, as at 21, to prevent said belts from slipping sidewise.

An electric motor 22, suitably secured in the casing 1, is operatively connected to the reel shaft 4 by a belt and pulley drive 23 to rotate the egg cleaning reel 3, and a belt and pulley drive 24 from said shaft 4 to the rear roller 20 serves to drive the pairs of egg supporting and feeding belts 17. The pairs of egg supporting and feeding belts 17 are driven, clockwise as viewed in Figures 3 and 4, to feed the eggs placed on the upper runs thereof downwardly and rearwardly, at a sharp incline, to the egg cleaning reel 3, which is to say, the sets of cleaner strips 11. The egg cleaning reel 3 is also rotated clockwise, as indicated by the arrows in Figures 3 and 4, so that the sets of cleaner strips 11 are rotated forwardly and upwardly against the eggs 18 on the side thereof opposite that supported by the pairs of belts, whereby said belts 7, on the one hand, and the sets of cleaner strips 11, on the other hand, act oppositely frictionally against opposite sides of the eggs 18 to rotate the same on said belts 17 about substantially horizontal axes parallel with the axis of rotation of the egg cleaning reel 3.

Egg guiding means is provided for causing the eggs 18 on the pairs of egg supporting and feeding belts 17 to wobble, or tumble, while being rotated, so that all parts of the eggs are subjected to abrasive cleaning action.

The egg guiding means comprises pairs of acute angled egg guiding rods 25 upstanding in front of the egg supporting and feeding belts 17 and spaced apart laterally in the pairs upon opposite sides of the pairs of said belts 17 to provide rearwardly and downwardly inclined pairs of egg guiding arms 25 above said pairs of egg supporting and feeding belts 17, substantially parallel with said belts, and between which the eggs 18 are placed on said belts 17. The pairs of egg guiding arms 26 converge rearwardly in the pairs. The egg guiding rods 25 are mounted for lateral tilting movement, as presently described, to adjust the egg guiding arms 26 into different set positions laterally of the pairs of egg supporting and feeding belts 17. For this purpose, said rods 25 are provided with lateral lower ends 27 frictionally clamped, rotatably, between a pair of superposed, horizontal clamping bars 28, 29 extending across the front end 2 of the casing 1 below the front roller 19, the lower bar 29 being suitably fixed at its ends in the cheek plates 5, and the upper clamping bar 28 being held in clamping relation to the lower clamping bar 29 by bolts 30 passing through bolt holes 31 in said bars. Cross grooves 32 in the upper clamping bar 28 seat the ends 27 of said rods 25 and prevent lateral play of said ends.

Hold-down rollers 33 of resilient material are provided for yieldingly bearing downwardly on the eggs 18 to hold the same on the pairs of egg holding and feeding belts 17. The hold-down rollers 33 are rotatably mounted on the front ends of resilient, upwardly bowed, roller tensioning arms 34 having rear ends suitably fixed, as at 35, on a cross rod 36 fixed in the cheek plates 5 above the egg cleaning reel 3 so that said arms 34 extend forwardly and downwardly over said reel 3 and the eggs 18. A frame 37 underlies the tensioning arms 34 and is pivoted on the rod 36 for upward adjustment, as shown in broken lines in Figure 3, to correspondingly adjust said arms 34 for varying the hold-down pressure exerted by said rollers 33. Buttons 38 pivoted on the cheek plate 5, as at 39, and which underlie the frame 37 are rotatably adjustable to adjust said frame.

Angular egg ejecting rods 40 are mounted, as presently described, on a bar 41 extending along and beneath the lower clamping bar 29 and clamped thereto by the bolts 30 extending through bolt holes 42 in said bar 41, the arrangement being such that said rods 40 are vertically swingable on the bar 41 to move one end 43 thereof upwardly between the egg supporting and feeding belts 17 of the pairs and against the eggs 18 on said belts 17 to eject the eggs upwardly and forwardly off said belts. At the other end thereof, said rods 40 are provided with lateral terminals 44 rotatable in top grooves 45 in the bar 41 and in which said terminals are held by the lower clamping bar 29. Vertical grooves 46 in said bar 41 permit said rods 40 to be swung as described. From the terminals 44, said rods 40 extend forwardly of the bar 41 and then downwardly and upwardly beneath said bar. The ends 43 of said rods 40 overbalance the rods to assume normal positions in which the ends 43 of said rods are below the top runs of the egg supporting and feeding belts 17.

A trough 49 extends across the front end of the casing 1 in position to receive the ejected eggs 18.

As will now be seen, eggs 18 placed on the pairs of egg supporting and feeding belts 17 will be fed toward the egg cleaning reel 3 at a downward angle against the rotating sets of cleaner strips 11 which are rotated against the eggs 18 with a wiping, resilient, abrading action while the eggs are rotated about a horizontal axes by the conjoint action of said belts 17 and strips 11. By tilting the egg guiding rods 25 to adjust the egg guiding arms 26 apart in the pairs a distance corresponding substantially to the size of the eggs between the ends thereof, the eggs 18 will be held with one or the other end thereof facing the egg cleaner strips 11. Conversely, by tilting said rods 25 to adjust the egg guiding arms 26 further apart than the size of the eggs between the ends of the same, the eggs will be permitted to wobble, sidewise, and tumble under the impact of the rotating cleaner strips 11 so that the entire surface of the eggs will be cleaned. After cleaning, the eggs 18 may be ejected, in the manner previously described, into the trough 44 for collection, the tensioning arms 34 for the hold-down rollers 33 yielding upwardly to permit the eggs 18 to pass forwardly under said rollers.

In the modified embodiment of my invention shown in Figures 8 and 9, side-by-side series of endless, flexible egg cleaner bands 50, of abrasive material, with endless band liners 51, of resilient material, are provided in lieu of the cleaner strips 11 and backing strips 12. The series of bands 50 and liners 51 are interposed between laterally spaced disks 52 fast on the reel shaft 53 and are hung in circular arrangement on pairs of lateral pins 54 on a pair of said disks, the pins 54 being spaced circumferentially around the disks 52 of the pair closer together than the diametrical size of the liners 51, so that said bands 50 may rotate about said pins freely when striking the eggs and are free to play outwardly and inwardly of the reel. This arrangement provides for double yielding of the bands 50 when the same strike the eggs and for reducing the abrasive action. Also, the bands 50 may rotate around the pairs of pins 54 to present new surfaces against the eggs. The disks 52 are suitably fixed, as at 55, on said shaft 53 for removal to replace the bands 50.

In the modified embodiment of the invention shown in Figures 10 and 11, rectangular plates 56 are detachably secured concentrically on the reel shaft 57, side by side, with corner pins 58 extending from a pair of the plates, and endless, abrasive bands 59, with resilient liners 60, circumscribe pairs of the pins 58 upon diametrically opposite sides of the shaft 57, and are loose on said pins to creep around the same under impact against the eggs to present new surfaces against the eggs. This arrangement provides for the use of larger sizes of cleaner bands than in the embodiment shown in Figures 8 and 9.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a machine of the class described, a horizontally disposed egg cleaning reel rotatably mounted with flexible abrasive cleaning means thereon, and driven means moving in a straight path below the axis of the reel for supporting and feeding eggs toward the same in a direction opposite to the direction of rotation of the reel and at a downward inclination whereby said reel and means conjointly act frictionally against opposite sides of the eggs to rotate the same while being cleaned.

2. In a machine of the class described, a horizontally disposed egg cleaning reel rotatably mounted with flexible abrasive cleaning means thereon, driven means moving in a straight path below the axis of the reel for feeding eggs toward the same in a direction opposite to the direction of rotation of the reel and at a downward inclination whereby said reel and means conjointly act frictionally against opposite sides of the eggs to rotate the same while being cleaned, and means extending longitudinally of said path along opposite sides thereof for guiding the eggs fed by said driven means.

3. In a machine of the class described, a horizontally disposed egg cleaning reel rotatably mounted with flexible abrasive cleaning means thereon, and driven means below the axis of the reel for feeding eggs toward the same in a direction opposite to the direction of rotation of the reel and at a downward inclination whereby said reel and means conjointly act frictionally against opposite sides of the eggs to rotate the same while being cleaned, said means comprising pairs of laterally spaced egg supporting and feeding belts.

4. In a machine of the class described, a horizontally disposed egg cleaning reel rotatably mounted with flexible abrasive cleaning means thereon, driven means movable in a straight path below the axis of the reel for feeding eggs toward the same in a direction opposite to the direction of rotation of the reel and at a downward inclination whereby said reel and means conjointly act frictionally against opposite sides of the eggs to rotate the same while being cleaned, and means for guiding the eggs fed by said driven means comprising laterally spaced pairs of egg guiding arms above said driven means extending longitudinally along opposite sides of said path for receiving the eggs therebetween and relatively separable in the pairs to permit the eggs to wobble between the pairs on said driven means.

5. In a machine of the class described, a horizontally disposed egg cleaning reel rotatably mounted with flexible abrasive cleaning means thereon, and driven means below the axis of the reel for feeding eggs toward the same in a direction opposite to the direction of rotation of the reel and at a downward inclination whereby said reel and means conjointly act frictionally against opposite sides of the eggs to rotate the same while being cleaned, said means comprising pairs of laterally spaced egg supporting and feeding belts, and means for guiding the eggs fed by said driven means comprising laterally spaced pairs of egg guiding arms above said pairs of belts extending longitudinally thereof along opposite sides of said pairs.

DOUGLAS G. AUSTIN.

REFERENCES CITED

The following references are of record in the file of this patent:

UNITED STATES PATENTS

| Number | Name | Date |
|---|---|---|
| 1,725,985 | Jenson | Aug. 27, 1929 |
| 1,964,295 | Miller et al. | June 26, 1934 |
| 1,981,744 | Nelson | Nov. 20, 1934 |
| 2,018,967 | Miller et al. | Oct. 29, 1934 |
| 2,035,042 | Bridgman | Mar. 24, 1936 |
| 2,235,404 | Manggaard | Mar. 18, 1941 |
| 2,276,581 | Jordan | Mar. 17, 1942 |
| 2,408,648 | Inman | Oct. 1, 1946 |